United States Patent
Benabid et al.

(10) Patent No.: US 9,203,203 B2
(45) Date of Patent: Dec. 1, 2015

(54) DEVICE FOR THE EXCITATION OF A GAS COLUMN ENCLOSED IN A HOLLOW-CORE OPTICAL FIBRE

(75) Inventors: Fetah Benabid, Rilhac Rancon (FR); Jean-Marc Blondy, Landouge (FR); Benoit Debord, Limoges (FR); Frederic Gerome, Limoges (FR); Raphael Jamier, Limoges (FR); Philippe Leprince, Gif-sur-Yvette (FR)

(73) Assignee: UNIVERSITE DE LIMOGES, Limoges (FR)

(*) Notice: Subject to any disclaimer, the term of this patent is extended or adjusted under 35 U.S.C. 154(b) by 0 days.

(21) Appl. No.: 14/114,621

(22) PCT Filed: Apr. 26, 2012

(86) PCT No.: PCT/FR2012/050927
§ 371 (c)(1),
(2), (4) Date: Oct. 29, 2013

(87) PCT Pub. No.: WO2012/146874
PCT Pub. Date: Nov. 1, 2012

(65) Prior Publication Data
US 2014/0048410 A1      Feb. 20, 2014

(30) Foreign Application Priority Data
Apr. 29, 2011   (FR) ..................... 11 53677

(51) Int. Cl.
*H01S 3/02*   (2006.01)
*H01S 3/22*   (2006.01)
(Continued)

(52) U.S. Cl.
CPC .............. *H01S 1/06* (2013.01); *G02B 6/02328* (2013.01); *H01J 65/042* (2013.01); *H01S 3/0323* (2013.01);
(Continued)

(58) Field of Classification Search
CPC . H01S 3/0975; H01S 3/0323; H01S 3/06741; H01S 3/22
USPC .............................................. 372/6
See application file for complete search history.

(56) References Cited

U.S. PATENT DOCUMENTS 3,493,845 A      2/1970   Bramley
4,049,940 A *   9/1977   Moisan et al. ........... 219/121.36
(Continued)

FOREIGN PATENT DOCUMENTS

EP    0 197 843     10/1986
EP    0 653 778      5/1995
(Continued)

OTHER PUBLICATIONS

Moutoulas C. et al: "A High-Frequency Surface Wave Pumped He-Ne Laser". Applied Physics Letters, AIP, American Institute of Physics, Melville, NY, US, vol. 46. No. 4, Feb. 1, 1985. p. 323-325. XP000706386. ISSN: 0003-6951. DOI: 10.1063/1.95618 pp. 323-325.
(Continued)

*Primary Examiner* — Yuanda Zhang
*Assistant Examiner* — Michael Carter
(74) *Attorney, Agent, or Firm* — Young & Thompson

(57) ABSTRACT

A device for the excitation of a gas medium (10) contained in a casing (12), the device being coupled to the casing (12) and disposed outside same and including an applicator that can generate lateral excitation inside the casing (12) over at least a portion thereof. The device is characterized in that the casing (12) is a hollow-core photonic dielectric structure (16), in which the core has a diameter smaller than 300 μm, and in that the applicator is of the microwave type and can be used to generate a surface wave that can create and confine a microplasma from the gaseous medium contained in the casing (12).

12 Claims, 3 Drawing Sheets

Figure 1:
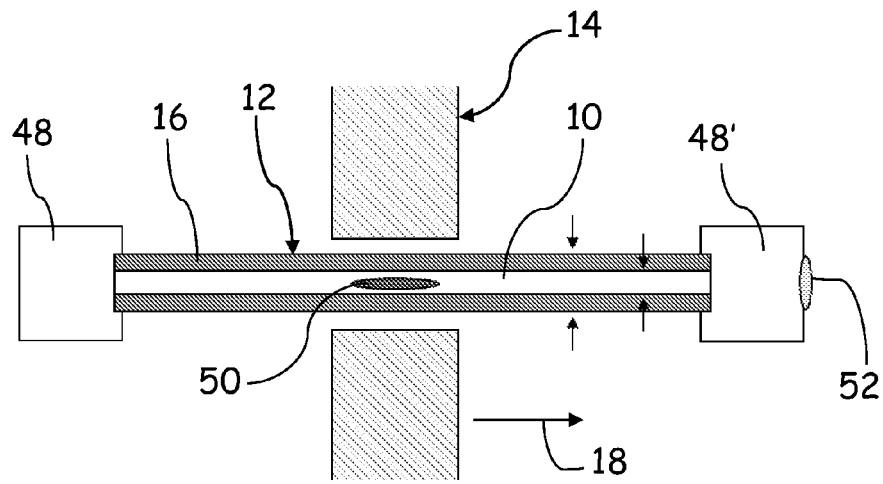

(51) Int. Cl.

| | | |
|---|---|---|
| *H01S 1/06* | (2006.01) | |
| *G02B 6/02* | (2006.01) | |
| *H01S 3/032* | (2006.01) | |
| *H01S 3/0975* | (2006.01) | |
| *H05H 1/46* | (2006.01) | |
| *H01J 65/04* | (2006.01) | |
| *H01S 3/067* | (2006.01) | |

(52) U.S. Cl.
CPC .............. *H01S 3/0975* (2013.01); *H01S 3/22* (2013.01); *H05H 1/46* (2013.01); *H01S 3/06741* (2013.01); *H05H 2001/4615* (2013.01)

(56) References Cited

U.S. PATENT DOCUMENTS

| | | | | |
|---|---|---|---|---|
| 4,698,822 | A * | 10/1987 | Leprince et al. | 372/70 |
| 5,359,621 | A * | 10/1994 | Tsunoda et al. | 372/82 |
| 2007/0280304 | A1* | 12/2007 | Deile et al. | 372/6 |
| 2014/0048410 | A1* | 2/2014 | Benabid et al. | 204/157.43 |

FOREIGN PATENT DOCUMENTS

| | | |
|---|---|---|
| FR | 2290126 | 10/1974 |
| FR | 2579855 | 10/1986 |
| WO | 2006/077437 | 7/2006 |

OTHER PUBLICATIONS

Rudolph W. et al: "Mid-IR laser emission from a C2H2 gas filled hollow core fiber". Transparent Optical Networks (ICTON), 2010 12th International Conference On, IEEE, Piscataway, NJ, USA. Jun. 27, 2010, pp. 1-4, XP031733164, ISBN: 978-1-4244-7799-9.

Holzer P. et al: "4% conversion of sub-microJ near-IR pulses to deep UV in fundamental mode of Ar-filled PCF", 2010 Conference on Lasers and Electro-Optics (CLEO) May 16-21, 2010 San Jose, CA, USA, May 16, 2010. pp. 1-2, XP031700636, ISBN: 978-1-55752-890-2.

Debord B. et al: "First ignition of an UV microwave microplasma in Ar-filled hollow-core photonic crystal fibers". 2011 37th European Conference and Exhibition on Optical Communication (ECOC 2011) IEEE Piscataway, NJ, USA, 2011, p. 1-3 pp., XP002684114. ISBN: 978-1-4577-1918-9.

Garcia M. et al: "Spectroscopic study of a surface-wave-sustained argon plasma column at atmospheric pressure by means of a power interruption technique", Spectrochimica Acta. Part B: Atomic Spectroscopy, New York, NY, US, vol. 55, No. 10, Oct. 2, 2000. pp. 1611-1621. XP027379613. ISSN: 0584-8547 pp. 1611-1621; figure 1.

Konenkov et al: "Study of Microwave-Excited He-Ne Laser", Radio Engineering and Electronic Physics, Scripta Publishing Co. Washington, US, vol. 26, No. 11, Nov. 1, 1981. pp. 70-73. XP000711734. pp. 70-71; figure 1.

* cited by examiner

DEVICE FOR THE EXCITATION OF A GAS COLUMN ENCLOSED IN A HOLLOW-CORE OPTICAL FIBRE

BACKGROUND OF THE INVENTION

1. Field of the Invention

This invention relates to a device for excitation of a gas column enclosed in a hollow-core optical fiber that makes it possible to obtain in particular a light source or a laser source.

2. Description of the Related Art

In the field of laser sources, there are several families:

The first family comprises laser diodes that are compact and inexpensive. However, these laser sources are limited to fragmented spectral ranges of conventional wavelengths ranging from 0.4 µm to 2 µm. This type of laser can be used, for example, as a pump source for bulkier lasers such as crystalline-type lasers.

The second family comprises crystalline-type or ion-type lasers that use a solid medium such as an emission medium, doped by ions. This type of laser is relatively expensive and bulky, and the emission wavelengths are limited to radiative transitions of ions (in particular rare earth ions) doping the solid medium and/or the emission spectrum of the solid medium.

The third family comprises gas lasers whose purpose is to excite a gas column enclosed in a tube or in a tank. According to the prior art, this type of laser has the advantage of creating a beam emitting at wavelengths that are inaccessible by the solid lasers cited above. In particular, the wavelengths of gas lasers can be in the ultraviolet range for the excimer lasers, in the visible range for the argon lasers, HE-NE, and in the infrared range for the $CO_2$ lasers. For this type of laser, the wavelength of the beam that is created depends on the composition and the pressure of the gas mixture present in the tube or in the tank.

Even if this laser design makes it possible to obtain beams with wavelengths within a broad spectrum, it is not fully satisfactory essentially for two reasons.

In a gas laser, the electroluminescent discharge originates from a longitudinal electrical field between two electrodes arranged in the interior and at each of the ends of a tube containing gas. The electrodes that are placed in the gas tend to corrode and to contaminate the medium. Consequently, it is necessary to clean these electrodes frequently, which tends to greatly increase the operating costs of such a laser.

According to a second drawback, the radiation emitted by this type of laser is not guided but is in free space. Consequently, it is necessary to provide a complex set of optical elements for moving the light beam toward its target, which leads to complex and bulky systems, difficult to regulate and to maintain. Finally, the configuration of interaction in free space between the excitation and the gas greatly limits the effectiveness of the laser (low optical yield).

Taking into account the primary characteristics of the lasers of the prior art, certain industrial needs are not met to the extent that there is no compact and inexpensive laser in the manner of a diode laser, able to emit a beam with an unconventional wavelength, in particular in the ultraviolet range, in the manner of a gas laser.

Taking into account the capacity of the gas lasers to create light beams with wavelengths within a broad spectrum, the purpose of the invention is to propose a gas laser source that is not very bulky and that has both a reduction in operating costs and a drastic increase relative to the optical yield.

In the field of plasmas, a device for excitation of a gas column enclosed in a tube, called "Surfatron," without electrodes placed in the interior of the tube is known. Such a device is described in particular in the patent FR-2,290,126.

According to this document, the gas mixture is placed in a hollow tube with a minimum diameter of 2 mm. The excitation device comprises a metal chamber, coaxial to the tube, bounded by a first cylindrical wall whose inside diameter is adjusted to that of the tube, a second cylindrical wall that is spaced and coaxial to the first cylindrical wall, and two side walls. According to a characteristic of this device, an annular space is made between the first cylindrical wall and a side wall that is said to be thin since it is less thick than the other side wall. In addition to the metal chamber, the excitation device comprises a coupling element in the form of a metal plate arranged in the chamber close to the first cylindrical wall and the annular space. The coupling element is connected to a feed that can provide a high-frequency excitation signal via a coaxial cable of which one thread is connected to the metal plate and the other to the second cylindrical wall.

According to this document, by providing a signal with a frequency that is between 100 and 1,500 MHz, it is possible to create in the annular chamber an electrical field whose direction close to the annular space is parallel to the shaft of the tube that contains the gas and creates surface waves that are able—if the power of the feed is adequate—to ionize the gas contained in the tube.

According to this document, this type of excitation device combined with a tube that is closed at each end containing a gas can constitute a light source. In turn, this light source can be used as an exciter of a solid medium for forming an ion-type laser.

The device described in the document FR-2,290,126 has the drawback of emitting an unguided radiation (in free space), with the function of the tube being limited to the role of chamber for gas and plasma.

Another excitation device described in the patent FR-2,579,855 was developed so as to obtain a laser effect by exciting a gaseous medium.

According to this document, the gas mixture is stored in a tube with an inside diameter on the order of 1.5 mm, and the excitation device comprises a microwave applicator that is able to create, on the exterior of the tube containing the gas, surface waves that can produce plasma in the interior of the tube.

The device that is described in this document corresponds to an objective of the invention, namely to provide an excitation device that can create a laser effect in a gaseous medium that can therefore—based on the composition and the pressure of the gas—have an unconventional wavelength.

However, the device illustrated in the patent FR-2,579,855 is not compact since the excitation device extends over a length on the order of 14 cm.

According to another problem, the applied microwave power is relatively high and greater than 200 watts. Finally, the radiation that is emitted by this device is not guided but is in free space, with the function of the tube proposed in the patent FR-2,579,855 being limited to the role of chamber for gas and plasma.

The document US-2007/0280304 describes a device for excitation of a gaseous medium contained in a casing whose diameter is between 500 and 750 µm. The excitation device comprises a system that is arranged on the exterior of the casing that can create an electromagnetic field at the level of the gaseous medium. This excitation system comes in the form of a coil wound around the casing. This excitation mode does not offer any particular control over the plasma that is created. Consequently, this embodiment is not of high quality because it does not comprise any means for optimizing the coupling of the electromagnetic excitation with the gaseous medium, although the risks of deterioration of the casing because of the high temperatures of the plasma are very high.

SUMMARY OF THE INVENTION

Also, the purpose of this invention is to remedy the drawbacks of the prior art by proposing a device for excitation of a compact gaseous medium, with a low energy consumption.

For this purpose, the invention has as its object a device for excitation of a gaseous medium contained in a casing, said device being coupled to said casing and arranged on the exterior of said casing, and comprising an applicator that can create a lateral excitation in the interior of said casing over at least a portion of said casing, characterized in that the casing is a hollow-core photonic dielectric structure whose core has a diameter that is less than 300 μm and in that the applicator is of the microwave type and makes it possible to create a surface wave that can create and confine a microplasma starting from the gaseous medium contained in the casing.

According to another objective, the purpose of the invention is to propose a compact gas laser source whose created radiation is guided, with a low operating cost.

BRIEF DESCRIPTION OF THE DRAWING FIGURES

Figure 2:
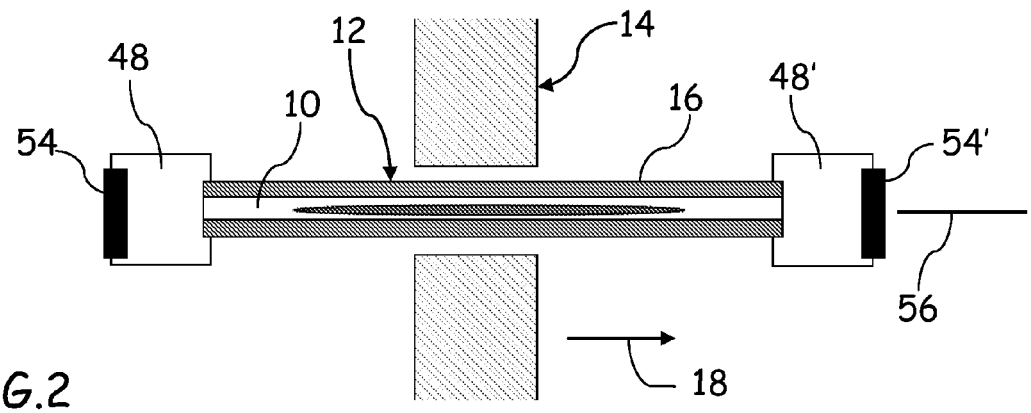
Figure 3:
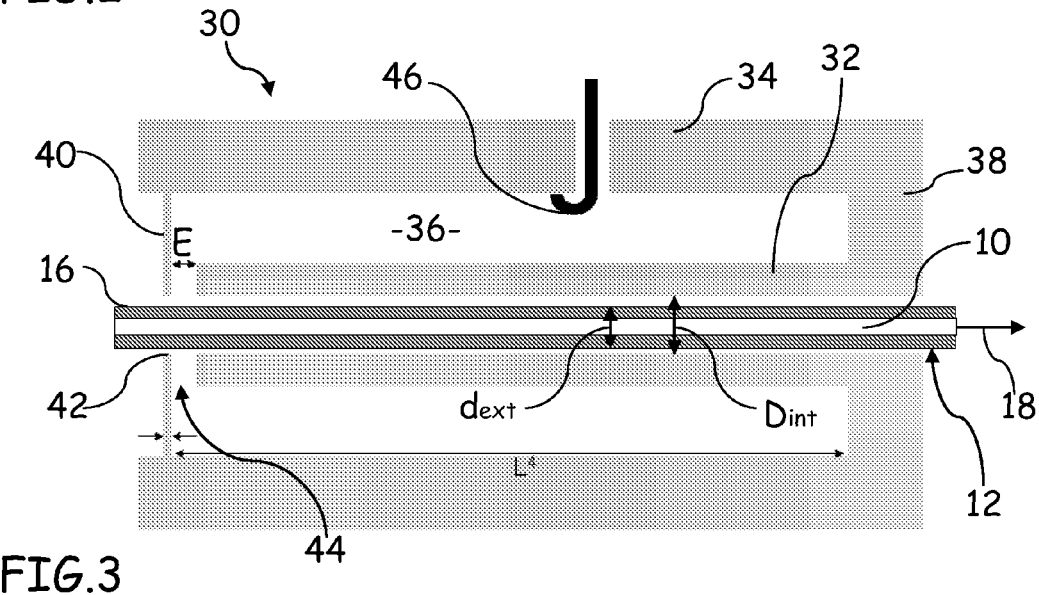
Figure 4A:
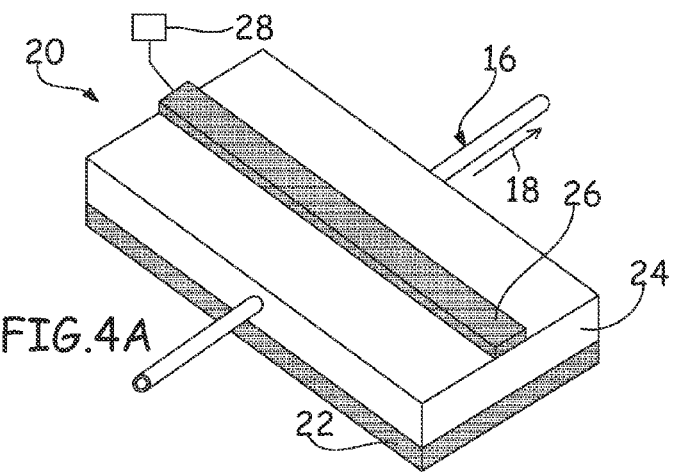
Figure 4B:
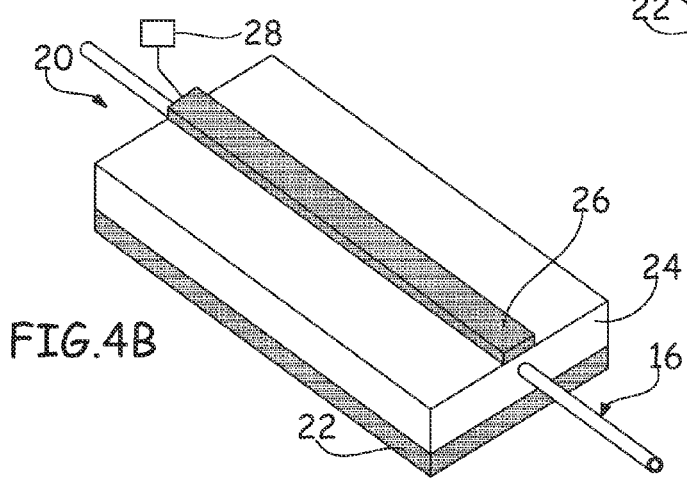
Figure 4C:
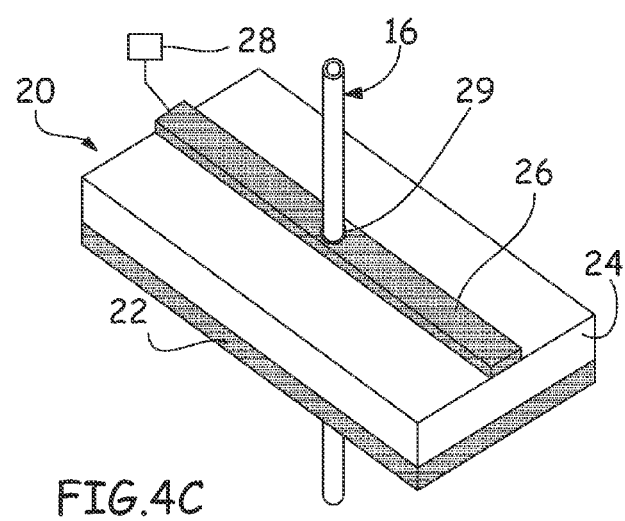
Figure 5A:
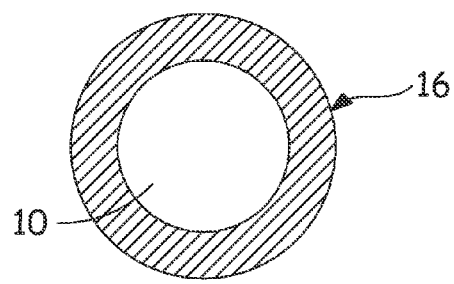
Figure 5B:
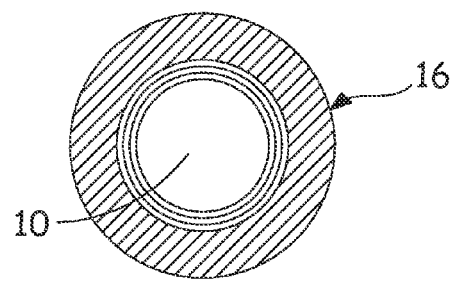
Figure 6:
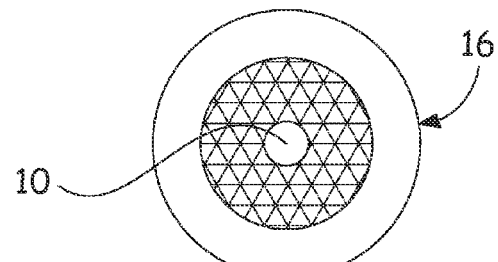
Figure 7:
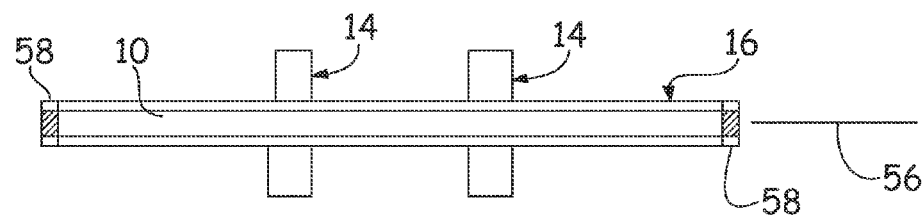
Figure 8:
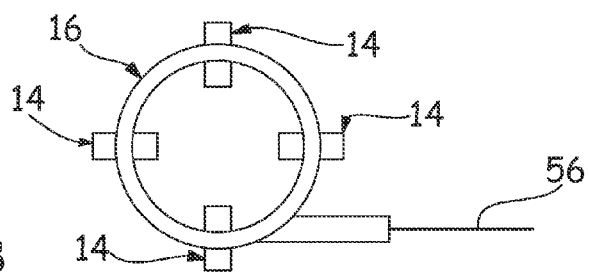

Other characteristics and advantages will emerge from the following description of the invention, a description that is provided only by way of example, relative to the accompanying drawings in which:

FIG. 1 is a diagram of a light source that is localized according to the invention, FIG. 2 is a diagram of a laser source according to the invention, FIG. 3 is a diagram of an excitation device according to a first variant of the invention, FIG. 4A is a diagram of an excitation device according to another variant of the invention, FIG. 4B is a diagram of an excitation device according to another variant of the invention, FIG. 4C is a diagram of an excitation device according to another variant of the invention, FIG. 5A is a cross-section of a first example of fiber used for containing the gaseous medium according to the invention, FIG. 5B is a cross-section of another example of fiber used for containing the gaseous medium according to the invention, FIG. 6 is a cross-section of another example of fiber used for containing the gaseous medium according to the invention, FIG. 7 is a diagram of a laser source according to another variant of the invention, and FIG. 8 is a diagram of a laser source according to another variant of the invention.

DETAILED DESCRIPTION OF THE INVENTION

FIGS. 1 and 2 show a gaseous medium 10 contained in a casing 12 that is coupled to an excitation device 14.

Hereinafter, a gaseous medium is defined as a gas or a mixture of several gases, characterized by, i.a., a composition and a pressure varying from 0.01 mbar to 50 bar.

According to a characteristic of the invention, the casing 12 comprises a hollow-core optical fiber 16. According to an important point of the invention, the diameter of the hollow core of the optical fiber is less than 300 μm. Preferably, the diameter of the core of the optical fiber varies from 1 to 200 μm. Advantageously, the thickness of the silica bridge that surrounds the core is less than 5 μm, preferably between 100 nm and 1 μm.

The hollow-core optical fiber 16 is characterized in particular by the diameter of its hollow core and by optogeometric parameters essentially linked to the nature of the sheath surrounding the hollow core.

As appropriate, the optical fiber can have a cylindrical hollow body and can come in the form of a dielectric capillary, as illustrated in FIG. 5A, or a more complex dielectric capillary with an air hole surrounded by a multilayer dielectric sheath as illustrated in FIG. 5B, or the optical fiber can be a microstructured optical fiber of which a structural example is illustrated in FIG. 6. Of course, the invention is not limited to the structure described in FIG. 6.

As a variant, the optical fiber can be replaced by any hollow-core photonic dielectric structure.

According to another characteristic of the invention, the excitation device 14 is coupled to the hollow-core optical fiber 16 and arranged on the exterior of said fiber and comprises a microwave-type applicator that can create—over at least a portion of said hollow-core optical fiber 16—a lateral excitation that makes it possible to produce a microplasma starting from the gaseous medium 10 in the interior of the hollow-core optical fiber.

According to an important point of the invention, the microwave-type applicator makes it possible to create a surface wave whose spatial distribution is essentially tubular, coaxial to the optical fiber, and whose intensity peak is located at the interface between the plasma and the periphery of the hollow core 16. Thus, the surface wave propagates at this interface and creates a plasma column that is highly localized in a micrometer structure, without any damage to the material of said structure that would be damaged in the absence of a surface wave by the temperature of the plasma that is on the order of 1500° C.

According to another advantage, the surface wave can propagate over several centimeters, which makes it possible to create a relatively long microplasma column.

According to a characteristic of the invention, the frequency of the microwave applicator varies from 50 MHz to 10 GHz.

Hereinafter, a lateral excitation is defined as the fields created by the excitation device 14 on the surface of the optical fiber 16 or at the core of the fiber being essentially oriented parallel to the longitudinal direction 18 of the fiber (the longitudinal direction corresponding to the largest dimension of the fiber).

Owing to this means of microwave excitation, more than 90% of the microwave energy that is found in the exciter is transferred to the gas column.

This excited gas column forms a plasma wave that in turn emits light.

Taking into account the nature of the casing 12 that comes in the form of a hollow-core optical fiber with a line attenuation of less than 10 dB/m, an optical yield that is clearly greater than the one obtained with a casing is obtained in the form of a simple tube.

In addition, owing to an optimal agreement between the plasma wave and the guided mode in the fiber, more than 90% of the light emitted by the plasma is guided by the fiber.

The combination of the dimension of the hollow core of the fiber and the nature of the excitation mode, namely a lateral excitation produced by a microwave applicator whose frequency is between 50 MHz to 10 GHz, makes it possible to obtain a compact device for excitation of a gaseous medium 10 since the portion of the fiber 16 at the level of which the lateral excitation is to be applied can be less than 5 cm, with a low energy consumption since the power provided to the exciter is less than 100 W.

According to the variants, the lateral excitation can be applied over the entire periphery of the hollow-core optical fiber 16 or only over a portion.

As appropriate, the excitation device can be coaxial, as illustrated in FIG. 3, or can be essentially flat, as illustrated in FIGS. 4A, 4B, and 4C.

According to the example illustrated in FIG. 4A, the excitation device 14 can come in the form of a microstrip line 20 comprising, in a known manner, a ground plane 22, a dielectric layer 24, a conducting line 26, and a control 28 (shown diagrammatically), with the hollow-core optical fiber 16 being arranged between the ground plane 22 and the conducting line 26, perpendicular to said conducting line 26, the control 28 being regulated in such a way as to obtain a maximum electrical field at the core of the hollow-core optical fiber 16. As a variant, as illustrated in FIG. 4B, the optical fiber 26 can be arranged parallel to the conducting line 26.

As a variant, as illustrated in FIG. 4C, the optical fiber 16 is arranged perpendicular to the conducting line 26 and to the ground plane 22, the microstrip line comprising an opening 29 (whose diameter is slightly larger than that of the fiber) to allow the passage of the fiber 16 and emitting an electrical field parallel to the shaft of the fiber 16.

According to another embodiment illustrated in FIG. 3, the excitation device is coaxial and comes in the form of a surfatron 30 that reproduces the elements described in the patent FR-2,290,126 with different dimensions.

Thus, the excitation device 30 comprises a first hollow cylindrical wall 32 with an inside diameter Dint that is slightly larger than the outside diameter dext of the fiber 16, a second hollow cylindrical wall 34 that is coaxial to and distant from the first cylindrical wall 32 in such a way as to bound an annular metal chamber 36 that is coaxial to the fiber 16, closed at a first end by a first side wall 38 arranged in a plane that is perpendicular to the longitudinal direction of the fiber 16 connecting the cylindrical walls 32 and 34 and at the other end by a second side wall 40 that is arranged in a plane that is perpendicular to the longitudinal direction of the fiber, connected to the second hollow cylindrical wall 34 with a central opening 42 whose diameter is essentially identical to Dint. According to an important point, an annular space 44 separates the end of the first hollow cylindrical wall 32 and the second side wall 40. In addition, the excitation device comprises a feed (not shown) that is capable of providing a high-frequency excitation signal by a coaxial cable of which one wire is connected to a metal element 46 arranged in the metal chamber 36 and the other to the second cylindrical wall 34. According to a characteristic of the invention, the metal element 46 comes in the form of a loop as illustrated in FIG. 3. This loop extends in a plane that contains the longitudinal direction of the fiber 16 and has a U shape in the interior of the metal chamber. This geometry of the metal element makes it possible to obtain a homogeneous electrical field in the interior of the chamber.

The feed and the metal element arranged in the metal chamber are not presented in more detail because they are known from the patent FR-2,290,126.

Applied to a hollow-core optical fiber 16, the excitation device 30 preferably has the following characteristics:

The annular space 44 preferably has a length E that varies from 1 to 5 mm based on the outside diameter of the fiber 16.

The inside diameter Dint of the hollow cylindrical wall 32 is to be slightly larger than the outside diameter of the fiber 16; preferably the space between the outside surface of the fiber 16 and the inside surface of the wall 32 is to be less than 2 mm. This characteristic makes it possible to optimize the coupling of the excitation device 14 and the fiber 16 and to limit the localized heating risks of the fiber 16.

According to another aspect, the length L of the chamber 36 is determined so that the excitation device is resonant. Thus, the length L is to be essentially equal to $\lambda/4+n\times\lambda/2$, with n being an integer and $\lambda$ the excitation wavelength.

According to the applications, the second side wall 40 is more or less thick. Thus, this wall can have a thickness of several millimeters for a localized light source or a thickness that is the thinnest possible and on the order of 1 mm for a laser source.

The invention is not limited to the embodiments of the excitation devices described above but covers all of the excitation devices that are capable of creating—on the surface of the hollow-core fiber or in the hollow core of the optical fiber—an electrical field whose component in the longitudinal direction of the fiber is enough to produce a plasma from the gaseous medium 10 without an element arranged in the interior of the fiber 16. Actually, if this is not the case, namely if the electrical field was created by two electrodes arranged in the core of the fiber, it would be difficult to monitor the discharge over time because of an excessive accumulation of charges on the walls bounding the hollow core of the optical fiber.

According to a first variant illustrated in FIGS. 1 and 2, the casing 12 that comprises the gaseous medium is not limited to the hollow-core optical fiber. In this case, the hollow-core fiber 16 empties at one of its ends into a cavity 48, with the other end being sealed, or empties at each of its ends into a cavity 48, 48'. In this case, the gaseous medium can be introduced into the casing 12 via at least one of the cavities 48, 48'.

According to another variant that is illustrated in FIGS. 7 and 8, the casing 12 that contains the gaseous medium consists of a hollow-core optical fiber 16 sealed at each end. In this case, it is possible to use a method as described in the document WO2006/077437 for introducing the gaseous medium at a given pressure into the hollow-core optical fiber 16.

According to a first application that is illustrated in FIG. 1, the device for excitation of a hollow-core optical fiber can be used to create a localized light source. In this case, the power that is used is weak. As illustrated in FIG. 1, the microplasma 50 produced in the core of the fiber 16 is localized.

According to an embodiment that is described for this application, the hollow-core optical fiber 16 comprises, at each end, cavities 48, 48' in the form of gas reservoirs, at least one of the two cavities comprising a transparent wall called a window 52 for allowing the light ray that is produced to exit from the casing 12, said window 52 being arranged in the extension of said fiber 16. As a variant, the hollow-core optical fiber 16 could comprise—at each of its ends—a sealing element of which at least one is transparent for the light ray produced at the core of the fiber 16.

According to another application illustrated in FIGS. 2, 7 and 8, the device for excitation of a hollow-core optical fiber can be used to create a gas laser source. In this case, the power that is used is higher than for the preceding application. The power is between 1 and 100 W. As illustrated in FIG. 2, the plasma produced in the interior of the fiber is distributed and extends beyond the zone covered by the excitation device.

According to an embodiment described for this application, the hollow-core optical fiber 16 comprises—at each end—cavities 48, 48' in the form of gas reservoirs, with the two cavities comprising a mirror 54, 54' for obtaining an amplification phenomenon, with one of the mirrors 54' being semi-reflecting for allowing the laser ray 56, produced by the source, to exit from the casing 12, with the mirrors 54, 54' being arranged in the extension of said fiber 16. The cavities 48 and 48' can be used to introduce the gaseous medium into the casing, for emptying it, or for monitoring the pressure of the gaseous medium. For this purpose, the cavities 48 and 48' can be equipped with valves and manometers. Preferably, at least one of the cavities comprises a window for making it possible to display the ray 56 that is emitted.

As a variant, the cavities 48, 48' can be replaced by photonic cells. In this case, the hollow-core optical fiber 16 is welded at each end to a segment 58 of solid fiber, with one of these segments ensuring the function of reflecting element, and the other ensuring the function of semi-reflecting element.

As required, the hollow-core optical fiber can be more or less long. Thus, its length can vary by 1 cm to 100 m.

Based on the desired compactness, the fiber 16 can be essentially rectilinear as illustrated in FIG. 7, or it can be wound or form a loop as illustrated in FIG. 8.

As appropriate, the laser source can comprise an excitation device 14 combined with a fiber 16 or several excitation devices 14 combined with the same fiber 16 as illustrated in FIGS. 7 and 8. According to a final variant, the entire length of the fiber 16 can be subjected to an excitation by means of either an excitation device that extends over its entire length or several excitation devices distributed over its entire length.

According to another arrangement, at least one of the mirrors bounding the optical amplification cavity is not necessarily placed at one of the ends of the hollow-core optical fiber 16. At least one of the mirrors can be distant from one of the ends of the optical fiber 16. Thus, micro-mirrors can be inserted into the hollow-core optical fiber 16 or a Bragg grating can be formed in the microstructured sheath in the case of a microstructured hollow-core optical fiber.

On the structural level, it is possible to provide one or more cooling systems for cooling the fiber 16 at the excitation device or devices 14.

On the functional level, the emitted ray 56 is polychromatic. The composition of the gaseous medium makes it possible to determine the wavelengths of the different lines obtained. The pressure of the gaseous medium makes it possible to promote certain lines relative to others. The optogeometric parameters of the hollow-core optical fiber 16 can make it possible to ensure the frequency filter function so as to spectrally filter certain lines and to promote others.

In addition, it is possible to select the fiber 16 based on its diameter or to adjust the power and the frequency of the waves used for the excitation of the gaseous medium for adjusting the length of the plasma and/or certain parameters of the emitted ray 56, in particular its power.

Finally, the laser source can operate in both a continuous mode and a pulsed mode.

On the experimental level, by selecting a dielectric capillary with a hollow core 107 µm in diameter as fiber 16, with argon as a gaseous medium with a pressure of 3 bar and an excitation power of 47 W with a frequency of 2.45 GHz, it is possible to observe a relatively stable plasma. With an excitation power of 35 W and a pressure of 2.8 bar, the optical power of the light beam is on the order of 5 mW, and a quasi-monomode beam is obtained.

The advantages obtained by the invention are as follows:

In contrast to a gas laser of the prior art, the light beam that is emitted is trapped in the core of the optical fiber and is guided by said fiber up to the outlet of the source. This advantage thus makes it possible to obtain a compact laser source that does not require a complex set of optical elements for shifting the light beam. Taking into account the absence of the complex set of optical elements, the costs associated with the adjustment of said elements and their maintenance are eliminated. In addition, the fact that the radiation that is emitted is guided ensures—at the fiber outlet—a spatial quality of the beam that is greater than that obtained by the devices of the prior art.

According to another aspect, the laser source is compact to the extent that the fiber 16 can be wound, if necessary.

According to another aspect, the laser source has reduced operating costs taking into account the fact that it does not require the maintenance of electrodes and that the power that is required for producing the light beam is reduced.

Finally, according to another aspect, the combined selections of the composition and the pressure of the gaseous medium as well as the hollow-core optical fiber 16 based in particular on its optogeometric parameters make it possible to obtain a laser source emitting fine and extremely frequency-stable lines in the ultraviolet range, the visible range, and the infrared range.

The excitation device according to the invention makes it possible to be able to create flexible, compact, laser light sources, at low cost, emitting a radiation in unconventional fields such as the ultraviolet or middle infrared. A deep ultraviolet radiation on the order of 100 to 300 nm could be used for the design of microelectronic components obtained by photolithography.

However, other applications could be considered, such as, for example, the treatment of waste water, the ablation of certain tissues, or the remodeling of the retina in the field of medicine.

The invention claimed is:

1. A device for excitation of a gaseous medium contained in a casing, with said device being coupled to said casing and arranged on the exterior of said casing, comprising:
  a microwave applicator adapted to create a lateral excitation in an interior of said casing over at least a portion of said casing, the microwave applicator being in a form of microstrip line comprising a ground plane, a dielectric layer, and a conducting line, with the hollow-core optical fiber being arranged between the ground plane and the conducting line, wherein
  the casing is a hollow-core photonic dielectric structure whose core has a diameter that is less than 300 µm and the microwave applicator makes it possible to create a surface wave that can create and confine a microplasma starting from a gaseous medium contained in the casing, said surface wave making possible creation of a surface wave having a tubular spatial distribution, coaxial to the hollow core, and whose intensity peak is localized at the interface between the microplasma and a periphery of the hollow core.

2. The device according to claim 1, wherein the diameter of the hollow core varies from 1 to 200 µm.

3. The device according to claim 1, wherein the casing has a line attenuation that is less than 10 dB/m.

4. The device according to claim 1, wherein the casing comprises a hollow-core optical fiber and at least one cavity provided at at least one of the ends of said fiber.

5. The device according to claim 1, wherein the casing consists of an optical fiber that is sealed at each end.

6. A light source comprising a device for excitation of a gaseous medium according to claim 1.

7. A laser source comprising a device for excitation of a gaseous medium according to claim 1.

8. The laser source according to claim 7, wherein the hollow-core optical fiber is welded at each end to a segment of solid fiber, with one of these segments ensuring the function of reflecting element and the other ensuring the function of semi-reflecting element.

9. The laser source according to claim 7, wherein at least one of the mirrors bounding the optical cavity is distant from an end of the hollow-core optical fiber.

10. The laser source according to claim 7, wherein the hollow-core optical fiber is a microstructured optical fiber.

11. The laser source according to claim 7, wherein the hollow-core optical fiber is a dielectric capillary with an air hole surrounded by a multilayer dielectric sheath.

12. A process for emission of a laser beam from a laser source according to claim 7, comprising:

utilizing optogeometric parameters of the hollow-core optical fiber for ensuring a frequency filter function.

\* \* \* \* \*